United States Patent
Wright et al.

[11] 4,040,974
[45] Aug. 9, 1977

[54] SYNTHESIZED GELLANTS CONTAINING SMECTITE-TYPE CLAY AND PROCESS FOR PRODUCING SAME

[75] Inventors: Alan C. Wright; Joseph Paul Rupert, both of Houston, Tex.

[73] Assignee: N L Industries, Inc., New York, N.Y.

[21] Appl. No.: 680,593

[22] Filed: Apr. 26, 1976

[51] Int. Cl.² ............................................. B01J 13/00
[52] U.S. Cl. .................................... 252/316; 252/28; 252/317; 423/331; 423/333
[58] Field of Search ......................... 252/316, 317, 28; 423/331, 333

[56] References Cited

U.S. PATENT DOCUMENTS

| | | | |
|---|---|---|---|
| 3,586,478 | 6/1971 | Neumann | 252/317 X |
| 3,671,190 | 6/1972 | Neumann | 423/331 X |
| 3,839,389 | 10/1974 | Neumann | 252/28 X |

Primary Examiner—Benjamin R. Padgett
Assistant Examiner—E. Suzanne Parr

[57] ABSTRACT

This invention provides a gellant which is a synthesized complex of a fluorine-containing trioctahedral smectite-type clay and an amorphous occluded phase selected from the group consisting of lithium hydroxide, sodium hydroxide, magnesium hydroxide, lithium oxide, sodium oxide, magnesium oxide, and mixtures thereof, the gellant having mole ratios of Li, Na, Mg and Si, expressed as oxides, and F of:

$$aLi_2O:bNa_2O:cMgO:dF:8SiO_2 \quad (I)$$

where $0.25 \leq a < 1.1$, $0 \leq b < 0.60$, $4.75 < c < 5.85$, $0.5 < d \leq 3.5$, $0.60 \leq a + b < 1.25$, and $6.0 < a + b + c < 6.65$. The gellant is produced by a process which comprises: (a) forming an aqueous suspension containing from 12 to 35% solids by weight, the solids having the chemical composition represented by formula I, by (i) combining and mixing hydrofluoric acid, magnesia, water, and a base selected from the group consisting of lithium hydroxide, sodium hydroxide, and mixtures thereof, until the base is dissolved; and (ii) adding a silica sol; (b) agitating and heating the suspension until a viscous slurry is obtained; (c) allowing the slurry to gel; (d) hydrothermally reacting the gel under autogenous pressure at a temperature in the range from about 85° to about 250° C for a period of time sufficient to form a well crystallized trioctahedral smectite-type clay; and (e) drying the product to form the gellant.

34 Claims, No Drawings

SYNTHESIZED GELLANTS CONTAINING SMECTITE-TYPE CLAY AND PROCESS FOR PRODUCING SAME

BACKGROUND OF THE INVENTION

The invention relates to synthetic swelling smectite-type clays, particularly to a new process for the manufacture of novel gellants containing smectite-type clays.

PRIOR ART

Academic interest in the synthesis of clay minerals has existed for over forty years. The following listed references particularly pertain to the synethesis of smectite-type clay minerals and to the properties of the synthetic smectite-type clays obtained:

L. L. Ames et al, "Factors Effecting Maximum Hydrothermal Stability in Montmorillonites." Am. Mineraologist 43, 641–648 (1958).

T. Baird et al, "Electron Microscope Studies of Synthetic Hectorite." Clay Minerals 9, 250–252 (1971).

T. Baird, et al, "An Electron Microscope Study of Magnesium Smectite Synthesis." Clay Minerals 10, 17–26 (1973)

W. Eitel, "Silicate Science. Vol. IV. Hydrothermal Silicate Systems" 1966 pp. 288+. "The Systems Water-Silicate-Alumina-Magnesia-Lithium or Sodium Oxide."

G. T. Faust et al, "A Restudy of Stevensite and Allied Minerals." Am. Mineralogist 44, 342–370 (1949).

F. H. Gillery, "Adsorption - Desorption Characteristics of Synthetic Montmorillonids in Humid Atmospheres." Am. Mineralogist 44, 806–818 (1959).

R. E. Grim, "Clay Mineralogy." Second Edition 1968 pp. 479–490. Chapter 13. "Synthesis of the Clay Minerals."

M. E. Harward et al, "Swelling Properties of Synthetic Smectites in Relation to Lattice Substitutions." Clays and Clay Minerals 13, 209–222 (1964).

S. Henin et al, "A Study of the Synthesis of Clay Minerals." Clay Minerals Bulletin 2, 110–115 (1954).

S. Henin, "Synthesis of Clay Minerals at Low Temperatures." Clay and Clay Minerals 4, 54–60 (1956).

J. T. Iiyama et al, "Unusually Stable Saponite in the System $Na_2O-MgO-Al_2O_3-SiO_2$." Clay Minerals Bulletin 5, 1961-171 (1963).

R. C. Johnson et al, "Water-Swelling Synthetic Fluormicas and Fluormontmorillonoids." Bureau of Mines R. I. No. 6235 (1963).

M. Koizumi et al, "Synthetic Montmorillonoids with Variable Exchange Capacity." Am. Mineralogist 44, 788–805 (1959).

W. Noll, "The Electron Microscope in the Study of Hydrothermal Silicate Reactions." Kolloid Z. 107, 181–90 (1944).

D. M. Roy et al, "Synthesis and Stability of Minerals in the System $MgO-Al_2O_3-SiO_2-H_2O$." Am. Mineralogist 40, 147–178 (1955).

C. B. Sclar et al, "High Pressure Synthesis and Stability of a New Hydronium-Bearing Layer Silicate in the System $MgO-SiO_2-H_2O$." Am. Geophysical Union. Transactions 46, 184 (1965).

H. Strese et al, "Synthesis of Magnesium Silicate Gels with Two Dimensional Regular Structure." Z. Anorg. Allg. Chem. 247, 65–95 (1941).

V. Stubican et al, "Isomorphous Substitution and Infrared Spectra of the Layer Lattice Silicates." Am. Mineralogist 46, 32–51 (1961).

D. C. Warren, et al, "A Morphological Study of Selected Synthetic Clays by Electron Microscopy." Clays and Clay Minerals 16, 271–274 (1968).

C. E. Weaver et al, "The Chemistry of Clay Minerals." 1973. pp. 169–172. Chapter 16. "Low Temperature Synthesis."

J. C. Yang, "The System Magnesia-Silica-Water Below 300° C. 1, Low-Temperature Phases from 100° to 300° C and Their Properties." I. Am. Ceramic Soc. 43, 542–549 (1960).

Interest in the commercial production of synthetic 2:1 layerlattice clay minerals commenced in the 1950's with a Fellowship at Carnegie-Mellon University headed by Dr. W. T. Granquist. This research was successful in establishing commercial processes for the hydrothermal synthesis of hectorite-like clays, saponite-like clays, mixed layer-type clays, and other minerals. Subsequently various other companies became active in the field of mineral synthesis, particularly the synthesis of smectite-type clays, especially hectorite-like clays. The following references particularly pertain to such syntheses and to the properties and uses of the synthetic smectite-type clays obtained:

U.S. Pat. Nos.

3,252,757 — Granquist — Synthetic Silicate Minerals 3,586,478 — Neumann — Syn. Hectorite-Type Clay Minerals 3,654,176 — Neumann and Sansom-Composition and Process for Making Stable Aqueous Sol of Synthetic Silicate 3,666,407 — Orlemann — Process for Producing Synthetic Hectorite-Type Clays 3,671,190 — Neumann — Synthetic Clay - Like Minerals of the Smectite Type and Method of Preparation.

3,839,389 — Organophilic Swelling Clays - Neumann 3,844,978 — Hickson — Layered Clay Minerals and Processes for Using 3,852,076 — Grasko — Aqueous Method of Microencapsulation of Capsules 3,852,405 — Granquist — Laminar Heavy Metal Aluminosilicates 3,855,147 — Granquist — Synthetic Smectite Compositions, Their Preparation, and Their Use as Thickeners in Aqueous Systems Great Britain Pat. Nos.

1,155,595 — Neumann — Compositions Containing Clay-Like Minerals 1,228,155 — Neumann — Clay Compositions 1,276,016 — Neumann and Sansom — Synthetic Silicate Compositions 1,294,253 — Pfizer, Inc. — Use of Synthetic Clay Containing No Lithium as Soil Anti-Redeposition Agent, in Detergents 1,298,201 — Sellars and Laybourn — Paints Articles W. T. Granquist et al, "A Study of the Synthesis of Hectorite." Clays and Clay Minerals 8, 150–169 (1959).

B. S. Neumann, "Behavior of a Synthetic Clay in Pigment Dispersions." Rheologica Acta 4, 250–255 (1965).

B. S. Neumann et al, "The Formation of Stable Sols from Laponite, A Synthetic Hectorite-Like Clay." Clay Minerals 8, 389–404 (1970).

B. S. Neumann et al, "The Rheological Properties of Dispersions of Laponite, A Synthetic Hectorite-Like Clay, in Electrolyte Solutions." Clay Minerals 9, 231–243 (1971).

R. Perkins et al, "Colloid and Surface Properties of Clay Suspensions. 1. Laponite CP." J. Coll. Interface Sc. 48, 417–426 (1974).

J. Taylor et al, "The Nature of Synthetic Swelling Clays and Their Use in Emulsion Paint." J. Oil Col. Chem. Assoc. 51, 232–253 (1968).

The structure of 2:1 layer-lattice clay minerals is well known. Such minerals contain a central layer of cations octahedrally coordinated to oxygen and hydroxyl anions which are linked through shared oxygen anions to two layers of cations tetrahedrally coordinated to oxygen and hydroxyl anions, one on each side of the central octahedral layer. Fluorine may substitute for the hydroxyl groups. For each unit cell of such clays there are 6 octahedral cation sites and 8 tetrahedral cation sites. The sum of the cationic charges for electroneutrality of the layer-lattices is 12 for the octahedral cation sites and 32 for the tetrahedral cation sites. Thus the 6 octahedral cation sites can be filled with 6 divalent (+2) cations which satisfies the required layer charge. Clays which contain approximately 6 octahedrally coordinated cations are called trioctahedral. The theoretical formula without considering lattice substitutions for trioctahedral 2:1 layer-lattice clay minerals is $[(R_6^{+2})^{VI}(D^{+4})_8^{IV} O_{20}(OH)_4] \, n \, H_2O$ (interlayer water). The number of cations in the octahedral layer of naturally occurring trioctahedral 2:1 layer-lattice clay minerals is within the range from 5.76 to 6.00. However, the 6 octahedral cation sites can also be filled with 4 trivalent (+3) cations which satisfies the required layer charge. Such clays which contain approximately 4 octahedrally coordinated cations are called dioctahedral. The theoretical formula without considering lattice substitutions for dioctahedral 2:1 layer-lattice clay minerals is $[(R^{+3})_4^{VI} (D^{+4})_8^{IV} O_{20}(OH)_4] \cdot nH_2O$ (interlayer water). The number of cations in the octahedral layer of naturally occurring dioctahedral 2:1 layer-lattice clay minerals is within the range from 4.00 to 4.44.

The octahedrally coordinated cation sites can accommodate cations which have an ionic radius not greater than 0.75 A and the tetrahedrally coordinated cation sites can accommodate cations which have an ionic radius not greater than 0.64 A. Thus various cations can isomorphously substitute for the divalent cations in the central octahedral layer of trioctahedral clays, for the trivalent cations in the central octahedral layer of dioctahedral minerals, and for the tetravalent cations in the outer tetrahedral layers of both types of minerals. Such substitutions give rise to a charge imbalance within the octahedral and tetrahedral layers in which the substitution occurs. The charge imbalance usually results from the substitutin of a cations with a smaller cation charge thus creating a negatively charged layer-lattice. This negative charge is neutralized by cations on the surface of the layer lattices.

Naturally occurring hectorite is a trioctahedral 2:1 layer-lattice magnesium silicate smectite clay mineral in which approximately 0.66 Li+ ions per unit cell substitute for 0.66 Mg$^{2+}$ and approximately 1 F$^-$ ion per unit cell substitute for OH$^-$. Thus the idealized structural formula for natural hectorite is:

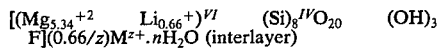

where the Mg+Li are present in the central octahedral layer and M is the charge balancing cation external to the layer-lattices of valence z. Hectorite-type minerals can be synthesized in which the number of Li+ per unit cell can be varied up to about 1.0 and in which F$^-$ can be substituted for OH$^-$. Thus hectorite-type minerals have the following idealized structural formula:

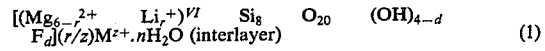

$$[(Mg_{6-r}^{2+} \quad Li_r^+)^{VI} \quad Si_8 \quad O_{20} \quad (OH)_{4-d} \quad F_d](r/z)M^{z+} \cdot nH_2O \text{ (interlayer)} \quad (1)$$

where $0 < r \leq 1$ and $0 \leq d \leq 4$. The formula is "idealized" since minor amounts or trivalent cations can substitute in both the octahedral layer and tetrahedral layers and other divalent cations can substitute for Mg. Natural hectorite is also impure and contains such contaminants as calcite, dolomite and other minerals.

Naturally occurring stevensite is a trioctahedral 2:1 layer-lattice magnesium silicate smectite clay mineral in which the octahedral layer contains only about 5.84 Mg$^{2+}$/unit cell. The idealized structural formula for stevensite is

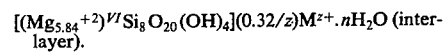

$[(Mg_{5.84}^{+2})^{VI}Si_8O_{20}(OH)_4](0.32/z)M^{z+} \cdot nH_2O$ (interlayer).

Stevensite-type minerals can be synthesized in which the number of vacant cation sites in the octahedral layer varies up to about 0.5 and in which F$^-$ can be substituted for the hydroxyl groups. Thus stevensite-type minerals have the following idealized structural formula:

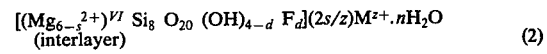

$$[(Mg_{6-s}^{2+})^{VI} \, Si_8 \, O_{20} \, (OH)_{4-d} \, F_d](2s/z)M^{z+} \cdot nH_2O \text{ (interlayer)} \quad (2)$$

where $0 < S \leq 0.5$ and $0 \leq d \leq 4$. As with hectorite-type minerals, the formula is "idealized" since minor amounts of trivalent cations can substitute in both the octahedral layer and in the tetrahedral layers and divalent cations can substitute for Mg.

As disclosed by Granquist and Pollack in the Clays and Clay Minerals article, hectorite-like clays can be prepared at reflux temperatures starting with an aqueous slurry of freshly precipitated Mg(OH)$_2$, silica gel, sodium hydroxide and/or lithium hydroxide or lithium fluoride. The synthetic clays so prepared are stated to have rheological characteristics in aqueous systems similar to those of natural hectorite. Neumann in example 7 of U.S. Pat. No. 3,586,478 repeated the most successful synthesis given in the Granquist and Pollack article, Series IB-72, and obtained a hectorite-like clay which possessed poor rheological characteristics in aqueous systems.

U.S. Pat. No. 3,586,478 discloses a hydrothermal process for preparing hectorite-like clays in which, in formula (1) $0.38 \leq r \leq 0.92$ when M=Na+, corresponding to a cation exchange capacity for the clay of from 50 milliequivalents per 100g. to 120 milliequivalents per 100g., and $1 \leq d \leq 4$. These hectorite-type clays, produced commercially under the tradename Laponite B, when dispersed in tap water at 2% have excellent rheological characteristics since they produce dispersions having a Bingham Yield Value of at least 40 dynes/cm$^2$, normally up to 250 dynes/cm$^2$. The claimed process comprises: (a) forming an aqueous slurry with heating and agitation by co-precipitation of a water-soluble magnesium salt, sodium silicate, and either sodium carbonate or sodium hydroxide, in an aqueous medium containing either lithium fluoride or a lithium compound and a compound containing fluorine chosen from hydrofluoric acid, fluosilicic acid, sodium silicofluoride, or sodium fluoride in certain atomic ratios of Si, Mg, Li and F; (b) hydrothermally treating the slurry, without washing it free from soluble salts for about 10 to 20 hours to crystallize the synthetic hectorite-like clay; (c) washing and dewatering the clay; and (d) drying the clay at a temperature up to 450° C. Co-precipitation is critical in the claimed process as is the presence of the alkali and fluoride during the co-precipitation. It is also necessary to avoid washing the slurry free from soluble salts.

It is readily apparent to one skilled in the art that the process claimed in U.S. Pat. No. 3,586,478 is very expensive and wasteful since it requires lithium, fluorine and sodium to be present during the synthesis of the hectorite-like clay in quantities which are far in excess of the stoichiometric quantities incorporated into the hectorite-like clay, and thereafter these soluble salts must be washed out of the product. A slightly excessive amount of magnesium is also present in the feed slurry during the synthesis. The following table presents the number of moles of Mg, Li, F, and Na present in the feed compositions and the hectorite-like clay products obtained based on the presence of eight moles of silicon, in Examples 1, 2, 3, 4 and 5 of U.S. Pat. No. 3,586,478.

| | U.S. Pat. No. 3,586,478 | | | | | | | |
|---|---|---|---|---|---|---|---|---|
| | Moles in Feed Slurry Calculated | | | | Moles in Product Chemical Analysis | | | |
| Example | Mg | Li | F | Na | Mg | Li | F | Na |
| 1 | 6.0 | 3.0 | 3.0 | 12.0 | (5.8)* | 0.53 | 2.0 | 0.53 |
| 2 | 6.0 | 2.4 | 2.4 | 12.0 | 5.52 | 0.48 | 1.5 | 0.48 |
| 3 | 6.0 | 4.0 | 9.0 | 17.3 | 5.43 | 0.57 | 2.77 | 0.57 |
| 4 | 6.0 | 0.8 | 3.6 | 14.8 | 5.65 | 0.35 | 1.7 | 0.35 |
| 5 | 6.0 | 6.0 | 6.0 | 12.0 | 5.41 | 0.59 | 2.58 | 0.59 |

*This value is suspect since Mg + Li > 6.0

This process is also expensive due to the low concentration (1-8%) of hectorite-like clay synthesized after hydrothermal treatment of the feed slurry, and because of the use of expensive water soluble magnesium salts. Furthermore, as all of the examples in the patent indicate, the feed slurry must be efficiently stirred during the hydrothermal treatment of the feed slurry in order to prevent settling and the formation of a non-homogeneous slurry.

Neumann U. S. Pat. No. 3,671,190 discloses synthetic trioctahedral smectite-type clay-like minerals and a process for their preparation wherein the smectite-type mineral has the general structural formula:

$$[Mg_a Li_b H_{4+c} Si_8 O_{24}]\ (12 - 2a - b - c) - (12-2a-b-c)M^+$$

where:
i. M is Na+, Li+ or an equivalent of an organic cation;
ii. the values of $a$, $b$ and $c$ are such that either:

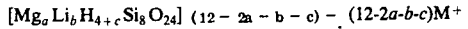
$a<6, b>0, c>0; b+c<2; \pm(a+b+c-6)<$ or $a<6, b=0, \pm c<2; \pm(a+c-6)<2;$ iii. $0.37 < (12 - 2a - b - c) < 0.93$ which corresponds to a cation exchange capacity of about 50 to 120 meq./100g.; and wherein
iv. when M is Na+ or Li+, a Bingham yield value of at least 50 dynes/sq. cm. as a 2% dispersion in tap water.

The disclosed process is very similar to that disclosed in U.S. Pat. No. 3,586,478, except that the hydrothermal treatment of the reaction slurry is conducted at a temperature of at least 170°C when lithium is present and at least 207°C when lithium is absent.

This process is also expensive to conduct due to: the low concentration of smectite-type clay synthesized (less than about 5%); the use of expensive water soluble magnesium salts; the necessity for using high temperature, high pressure stirred autoclaves; and the necessity for using lithium, sodium, and silicon compounds during the synthesis of the smectite-type clay which are in excess of the stoichiometric quantities of these metals incorporated into the clay, and which are subsequently filtered and washed out of the clay.

Although synthetic smectite-type clays have many uses such as in thickening paints, cosmetics, and the like, and as a substrate for the preparation of oleophilic clays, as evidenced by the patents and articles cited hereinbefore, this same literature indicates that various characteristics/properties of these synthetic clays need improving. Thus British Pat. No. 1,155,595 and U.S. Pat. No. 3,671,190 teach the addition of well known clay peptizers to the synthetic clay in order to prepare colloidal dispersions, i.e., sols, when the synthetic clay is mixed with water. By the use of such peptizers the ease of introduction of the synthetic clay into various aqueous media is increased.

SUMMARY OF THE INVENTION

An object of the invention is to provide a gellant which is easily dispersible and which has viscosity building characteristics in aqueous systems, the viscosity being considerably delayed upon dispersing the gellant in deionized water. This novel gellant is a synthesized complex of a trioctahedral smectite-type clay and a compound selected from the group consisting of lithium oxide, sodium oxide, magnesium oxide, lithium hydroxide, sodium hydroxide, magnesium hydroxide, and mixtures thereof, the gellant having mole ratios of Li, Na, Mg and Si, expressed as oxides, and F of:

$$a\ Li_2 O: b\ Na_2 O: c\ Mg\ O: d\ F: 8\ Si\ O_2 \qquad (I)$$

where $0.25 \leq a < 1.1, 0 \leq b < 0.60, 4.75 < c < 5.85, 0.5 < d \leq 3.5, 0.60 \leq a+b < 1.25,$ and $6.0 < a+b+c < 6.65$. This gellant is further characterized as having a cation exchange capacity (CEC) of about 0.7 to 1.2 milliequivalents per gram (meq./g.), a Bingham Yield Value of at least about 50 dynes per square centimeter (dynes/cm²) as a 2% dispersion in water, and the ability to readily disperse in deionized water, within 15 minutes at a concentration of 2% by weight with only low shear mixing, to produce a sol having a low viscosity and a Bingham Yield Value less than 20 dynes/cm², which sol is slowly converted to a thixotropic gel having a Bingham Yield Value above 50 dynes/cm².

It is another object of this invention to provide a process for the synthesis of such a gellant which utilizes in the feed composition stoichiometric quantities of the metals and fluorine incorporated into the gellant, which utilizes magnesia as the source of magnesium, which utilizes a gel state synthesis and thus requires no mixing during prolonged hydrothermal treatment of the feed, which requires no filtration and washing of the gellant, and in which the concentration of solids in the feed, and hence the concentration of gellant synthesized, can be varied up to about 35% by weight.

The process comprises:

a. forming an aqueous suspension containing from 12% to 35% solids by weight, the solids having the chemical composition represented by formula I, by:
  i. slowly combining and mixing hydrofluoric acid, magnesia, water, and a base selected from the group consisting of lithium hydroxide, sodium hydroxide, and mixtures thereof, until the base is dissolved; and
  ii. adding a silica sol;
b. agitating and heating the suspension until a viscous slurry is obtained;
c. allowing the slurry to gel;
d. hydrothermally reacting the gel under autogenous pressure at a temperature within the range from about 85°C to about 250°C for a period of time sufficient to form a well crystallized trioctahedral smectite-type clay and a gellant having the previously indicated properties; and
e. drying the product to form the gellant.

DETAILED DESCRIPTION OF THE INVENTION INCLUDING PREFERRED EMBODIMENTS

As indicated, the first step (a) in the process of this invention comprises forming an aqueous suspension containing from 12 to 35% solids by weight, preferably at least 15%, the solids having the chemical composition represented by formula I. The suspension is formed by (i) mixing together hydrofluoric acid (HF), magnesia (MgO), water, and a base selected from the group consisting of lithium hydroxide (LiOH), sodium hydroxide (NaOH) or mixtures thereof, until the base is dissolved; and (ii) adding a silica sol.

In step (i) the order of addition of the MgO, HF, base and water is not critical in preparing a gellant having the desired rheological properties. However, it is critical in preparing the preferred gellants of this invention, which produce relatively clear dispersions in deionized water, that the magnesia is reacted with the HF before addition of the base. Preferbly the magnesia is mixed into the water before slowly adding the HF. Because the reaction of the HF and MgO is exothermic, the HF must be added slowly while allowing the mixing to evenly distribute the heat involved in order to eliminate "bumping" which occurs due to localized reactions. The HF is added as an aqueous solution conveniently containing from 20 - 70% HF, preferably 25 to 35%. The concentration of MgO and HF in this step must be such that the concentration of solids in the gel, produced later, is within the range from 12 to 35%. The maximum concentration of MgO is limited to less than about 30%. It is sufficient to mix the HF, MgO and water together until the reaction is complete, which is indicated when the temperature of the reaction mixture ceases to rise. Generally five minutes is sufficiently although a longer mixing time is not harmful.

Thereafter NaOH and/or LiOH, as required by formula I, is added to the MgO + HF suspension and mixed until the base is dissolved. Preferably the base is added as a solid in order that the heat of reaction of the base with the suspension is utilized to increase the temperature of the suspension. However, the base can be added as an aqueous solution provided that the concentration of base is such that the final gel will contain from 12 to 35% solids.

In step (ii) a silica sol is added while mixing and the mixing is thereafter continued in step (b), with heating of the suspension until a viscous slurry is obtained. The viscosity of the mixture upon addition of the silica sol increases to a maximum and then decreases as the remainder of the silica sol is added. Depending on the composition of the mixture, the final mixture may be extremely fluid to viscous. However, on continued mixing with heating in step (b) the viscosity of the mixture decreases producing a fluid suspension which must be stirred to prevent settling of solids until the viscosity increases such that the solids no longer settle and an irreversibly viscous slurry is obtained. Preferably only gentle agitation is needed to keep the solids suspended. A low rpm mixer is sufficient. It is believed that, during this heating and mixing step, synthetic hectorite-like clay microcrystals are formed which increase the viscosity of the suspension — first creating a viscous homogenous slurry from which no settling occurs, and finally a gel in step (c) as more smectite-type clay is synthesized. The apparent viscosity of the slurry, as measured with a Fann rotational viscometer (API Standard Procedure RP 13B, November, 1972), should be at least 10 centipoise (cp.), preferably at least 15 cp., in order to keep the solids from settling.

In step (c) this viscous slurry is allowed to gel, with or without stirring. Conveniently, during step (c), the slurry is removed from the vessel containing the agitating means and is transferred to the vessel where the gel is to be statically hydrothermally treated in the step (d).

The hydrothermal treatment of the gel in step (d) may be carried out at any convenient temperature above about 85°C, preferably from 85° to about 250°C, under autogenous pressure. Since the pressure rapidly increases above about 165°C, thus requiring special autoclaves as the reaction vessel, it is preferred to operate at temperatures in the range from about 85° to 165°C, preferably from 95° to 165°C. The gel is hydrothermally treated for a period of time sufficient to synthesize a well crystallized trioctahedral smectite-type clay. Generaly from 4 hours to 120 hours is sufficient depending on the temperature. As the temperature increases the required hydrothermal treatment time decreases. The criterion sought in the present invention is that the hydrothermal treatment is conducted for a sufficient period such that the product then existing, after forming a gellant by drying to less than 10% moisture, preferably less than 5% moisture, will disperse in deionized water at a concentration of 2% within 15 minutes with only low shear mixing to produce a sol having an initial Bingham Yield Value less than 20 dynes/sq. cm.

Finally, in step (e) the product resulting from the hydrothermal treatment is dried to produce the desired gellant. Before the drying the product is a waxy solid containing from about 65 to about 85% water. Dispersion of this product in water is extremely difficult and requires prolonged high shear conditions. After drying at a temperature less than about 400°C, preferably less than about 250°C, the gellant formed, in accordance with one aspect of this invention, readily disperses in deionized water to form a low viscosity sol. The ease of dispersion is such that the gellant completely disperses within 15 minutes with only hand shaking at a concentration of 2% by weight in deionized water, as indicated by the disappearance of any visible particles clinging to the sides of the vessel containing the dispersion, to form a low viscosity sol having a low Bingham Yield Value less than 20 dynes/cm$^2$.

Generally it has been observed that the rate of viscosity increase of the viscous slurry can be decreased by increasing the degree of shear applied to the slurry. Thus if the viscous slurry is transferred to another vessel during step (c), the rate of viscosity increase of the slurry can be decreased by increasing the mixing rate of the slurry. This will decrease the possibility of premature gelation of the slurry before the transfer is complete. It has also been occasionally observed that when the degree of shear applied to the suspension in step (b) is increased the reaction time to form a viscous slurry is increased. The reason for this is not known. Thus it is preferred that a minimum degree of shear be applied to the suspension in step (b), the agitation being sufficient to keep the solids suspended. Intermittent mixing is sufficient.

Optionally the mixture of water, magnesia, hydrofluoric acid and base can be subjected to a high degree of shear, such as is imparted by a colloid mill, to reduce the particle size of the magnesia. The suspension obtained after adding the silica sol can also be subjected to a high degree of shear. It has been determined that such shearing provides gellants that form clearer dispersions in water.

Silica sols are commercially available from E. I. Dupont de Nemours & Co., Inc., Nalco Chemical Co., and other companies. The surface area of the silica in the sols must be greater than 100 square meters per gram (sq.m./g.), preferably greater than 200 sq.m./g. The reactivity of the silica increases as the surface area increases. Hence, as the surface area of the silica increases; the time required for the suspension to form a viscous slurry decreases; the time required for the slurry to gel decreases; and the hydrothermal treatment time decreases. Representative commercially available silica sols are listed in Table 1.

able magnesias which meet these criteria are Fisher M-49 grade, Michigan 15 and 1782 from Michigan Chemicals, Magox HR98 and HR98 Fine from Basic Chemicals and Dow 5800 magnesium oxide from Dow Chemical Co.

Six features of the process of this invention merit special attention. All are critical and contribute to the success of the process as a commercially operable process and as a means of producing a gellant containing fluorine-containing trioctahedral smectite-type mineral which possesses commercially desirable properties.

The first feature is that only stiochiometric quantities of the metals and fluorine which are desired in the gellant are present during the synthesis of the gellant.

Secondly, the source of magnesium is magnesium oxide which is commercially available and less expensive than other purified magnesium compounds.

Thirdly, a silica sol is used as the source of silica. The sol must be added to the reaction mixture only after all of the other desired components of the mixture have been combined.

Fourth, the process requires a high solids content in the feed suspension and thereafter. This results in faster reaction rates, higher gellant production rates, and lower production costs.

Fifth, the reaction mixture is gelled during the hydrothermal treatment. This eliminates the necessity of stirring the mixture with all the problems attendent thereto. The hydrothermal treatment may simply be carried out by heating the gelled feed in a suitable closed container in an oven set at the desired temperature.

Sixth, the process requires no filtration and washing

Table 1

| Company | Colloidal Silica Sols | | | | | |
|---|---|---|---|---|---|---|
| | DuPont (LUDOX Products) | | | | | |
| Type | HS-40 | HS | AS | LS | SM-30 | TM |
| Stabilizing Counter Ion | Na+ | Na+ | NH$_4$+ | Na+ | Na+ | Na+ |
| Particle, Size, mµ | 13–14 | 13–14 | 13–14 | 15–16 | 7–8 | 22–25 |
| Specific Surface Area, sq.m./g. | 210–230 | 210–230 | 210–230 | 195–215 | 375–420 | 125–140 |
| Silica (SiO$_2$), wt. % | 40.0 | 30.0 | 30.0 | 30.0 | 30.0 | ≧49.0 |
| pH at 25° C | 9.7 | 9.8 | 9.6 | 8.4 | 9.9 | 8.9 |
| SiO$_2$/Na$_2$O (by wt.) | 93 | 93 | 120* | 300 | 50 | 230 |
| *SiO$_2$/NH$_3$ (by wt.) | | | | | | |

| Company | Nalco Chemical Co. (NALCOAG Products) | | | | |
|---|---|---|---|---|---|
| Type | 1130 | 1030 | 1140 | 1050 | 1034A |
| Stabilizing Counter Ion | Na+ | Na+ | Na+ | Na+ | H+ |
| Particle Size, mµ | 8 | 13 | 15 | 20 | 20 |
| Specific Surface Area, sq.m./g. | 375 | 230 | 200 | 150 | 150 |
| Silica (SiO$_2$), wt. % | 30 | 30 | 40 | 50 | 34 |
| pH at 25° C | 10.0 | 10.2 | 9.7 | 9.0 | 3.2 |
| SiO$_2$/Na$_2$O (by wt.) | 46 | 75 | 100 | 143 | <680 |

The concentration of silica in the sol must be sufficiently large that the concentration of solids in the suspension after adding the silica sol is from 12 to 35%, preferably from 15 to 35% by weight. Thus depending on the composition of the gellant and the concentration of solids before adding the silica sol, the silica sol should contain at least 10% silica.

Any uniformly calcined magnesia having a BET nitrogen surface area in excess of about 10 m.$^2$/g. and a magnesia content of greater than about 95% on an ignited basis may be employed. Typically bulk magnesia contains a mixture of periclase (MgO) and brucite (Mg(OH)$_2$) depending on the degree of rehydration following calcination. The ratio of these components appears to have little effect on the synthesis process provided a high surface area is maintained. The preferred mesh size is -200M so that rapid settling in the initial feed mixture is minimized. Several commercially availof the gellant and, indeed, filtration is not practicable since the un-dried gellant is a waxy solid, and washing is detrimental in that the excess base required to be present in the gellant of this invention would be removed.

The gellants of this invention have the following characteristics:

a. the ability to disperse within 15 minutes in deionized water at a concentration of 2% to produce a sol having a low viscosity and a Bingham Yield Value less than about 20 dynes/cm$^2$., which sol is converted within 48 hours to a thixotropic gel having a Bingham Yield Value greater than about 50 dyns/cm.$^2$;

b. a Bingham Yield Value of at least about 50 dynes/cm.$^2$ as a 2% dispersion in water containing 4–10 meq./l. of Ca$^{2+}$ and/or Mg$^{2+}$;

c. a cation exchange capacity of about 0.7 to 1.2 milliequivalents per gram;

d. a crystalline phase which is a trioctahedral smectite-type clay mineral; and e. a composition having mole ratios of Li, Na, Mg, and Si, expressed as oxides, and F of:

$$a\text{Li}_2\text{O}:b\text{Na}_2\text{O}:c\text{MgO}:d\text{F}:8\text{SiO}_2$$

where $0.25 \leq a < 1.1$, $0 \leq b < 0.60$, $4.75 < c < 5.85$, $0.5 < d \leq 3.5$, $0.60 < a+b < 1.25$, and $6.0 < a+b+c < 6.65$.

The limitation that the sum $(a+b+c) > 6.0$ is an indication that the gellant contains an occluded phase consisting of a compound of Li, Na, and /or Mg selected from the group consisting of the oxides and hydroxides of these metals, and mixtures thereof. Thus the gellant is a synthesized complex of a trioctahedral smectite-type clay and an amorphous occluded compound selected from the group consisting of lithium hydroxide, sodium hydroxide, magnesium hydroxide, lithium oxide, sodium oxide, magnesium oxide, and mixtures thereof.

The Bingham Yield Values of dispersions of the gellants of this invention is deionized water immediately after preparing the dispersions are very low. This allows the preparation of aqueous sols of the gellants for easy incorporaton of the gellant into the aqueous medium to be thickened, such as a latex paint system. However, the gellants are excellent thickening agents as indicated by the viscosity and Bingham Yield Value of the dispersions after aging for 48 hours. When the gellants are dispersed in water containing from 4–10 meq./l. of $Ca^{2+}$ and/or $Mg^{2+}$, the initial Bingham Yield Values are greater than 50 dynes/cm.$^2$. The Bingham Yield Values of dispersions of this gellant depends on the concentration of the gellant, the type and concentration of electrolytes present in the water, and the type and concentration of other materials in the dispersion, such as hydrophilic polymers. The effect of electrolytes and polymers is generally the same as their effect on dispersions of naturally occurring smectite clays and other synthetic smectite-type clays.

The preferred gellants of this invention, at a concentration of 2% in deionized water, produce dispersions which have at least 85% light transmission as measured with a Hach Meter having a filter with a corning number of 5330 (water = 100% transmission) within 48 hours after preparation of the dispersions. Such gellants have mole ratios of Li, Na, Mg and Si, expressed as oxides, and F of:

$$a\text{Li}_2\text{O}:b\text{Na}_2\text{O}:c\text{MgO}:d\text{F}:8\text{SiO}_2$$

where $0.50 < a < 1.05$, $0 \leq b < 0.50$, $5.0 \leq c < 5.85$, $1.5 \leq d \leq 3.0$, $0.60 < a+b < 1.25$, and $6.0 < a+b+c < 6.65$. These gellants have a cation exchange capacity in the range of about 0.80–1.13 meq./g. Especially preferred are gellants which produce dispersions at 2% in deionized water which have at least 90% light transmission, same basis, within 48 hours after preparaton of the dispersions. Such gellants are obtained by the process of this invention where $0.50 < a < 0.80$, $0 \leq b < 0.50$, $5.1 < c < 5.7$, $1.5 < d < 3.0$, $0.60 < a+b < 1.0$, and $6.025 < a+b+c < 6.4$. The cation exchange capacity of these gellants range from about 0.80–1.00 meq./g.

The gellants produced by the process as disclosed are useful as thickeners/gelling agents for aqueous systems as disclosed in Neumann U.S. Pat. No. 3,586,478 and Neumann U.S. Pat. No. 3,671,190, each incorporated herein by reference. The gellants are also useful in preparing: refractory laminates as disclosed in Bever et al. U.S. Pat. No. 3,878,034, incorporated herein by reference; multi-color aqueous paints, etc., as disclosed in Zola U.S. Pat. No. 3,458,328, incorporated herein by reference; detergent compositions as disclosed in Nirschl et al U.S. Pat. No. 3,862,058, incorporated herein by reference; and pesticidal formulations as disclosed in Hyson et al. U.S. Pat. No. 3,832,468, incorporated herein by reference.

The smectite-type clay in the gellants when first formed as described have an exchangeable cation which is $Li^+$, $Na^+$ or a mixture thereof. These cations can be exchanged with other cations to form additional commercially useful products. Thus these cations can be exchanged with a metallic cation having a Pauling electronegativity greater than 1.0 to form catalytically active materials. Such materials are especially active catalysts for the alkylation of aromatic hydrocarbons with alkyl halides and/or unsaturated hydrocarbons such as alkenes. These catalysts are also useful as components of hydrocarbon cracking catalysts, hydrotreating catalysts, and the like.

The exchangeable $Li^+$ and $Na^+$ can be replaced with an organic cation or mixture of organic cations to form organophilic gellants for organic systems. These organophilic gellants which are useful in making greases and as suspending agents in organic systems such as paints may be prepared by dispersing the gellant in water and reacting the gellant with the organic compound. The gellant is readily flocculated. Filtration and washing of the organophilic gellant results in a removal of essentially all of the sodium and all of the lithium except that which is present within the octahedral layer of the smectite-type clay when the amount of organic compound is at least equal to the exchange capacity of the gellant. The excess magnesium oxide or magnesium hydroxide which is present in the gellants remains as an occluded phase in the organophilic gellants. The amount of organic cation should be at least equal to the cation exchange capacity of the gellant, preferably from 100 to 250 milliequivalents of organic compound per 100 grams of gellant.

Examples of organic compounds or salts thereof which will react with the gellants are those compounds which contain at least one cation per molecule selected from the group consisting of ammonium, phosphonium, oxonium, sulphonium, arsonium, stibonium, and mixtures thereof. Preferred are organic ammonium salts, particularly quaternary ammonium salts. Preferably the organic cation contains at least one aliphatic group, more preferably an alkyl group, containing at least 10 carbon atoms, desirably at least 12 carbon atoms. Advantageously the organic cation contains a total of at least 18 carbon atoms. Specific examples of suitable organic cations are dimethyl dioctadecyl ammonium, dimethyol benzyl dodecyl ammonium, dimethyl benzyl hydrogenatedtallow ammonium, methyl benzyl dihydrogenatedtallow ammonium, trimethyl hexadecyl ammonium, trimethyl behenyl ammonium, and mixtures thereof.

In the examples, the following starting materials were used unless otherwise noted: the silica source was Nalcoag 1130, a sodium stabilized silica sol containing 30.0% $SiO_2$ and 0.65% $Na_2O$; the magnesia source was Magox HR98, a high surface area (136 m.$^2$/g.) calcined magnesite containing 98% MgO on a volatile free basis having a particle size such that 99% passes through a 200 mesh screen; the lithia source was technical LiOH.H$_2$O containing 56.6% LiOH; the soda source was a Fisher Chemical Co. standardized 10N NaOH solution; the fluoride source was technical hydrofluoric acid containing 70% HF which was diluted with water before use to a final HF concentration of 37.1%.

EXAMPLE 1

Fifty-three samples were prepared by changing the values of $a$, $b$, $c$, $a+b$, and $a+b+c$ in formula I within the following ranges: $0.2 \leq a \leq 1.185$; $0.165 \leq b \leq 0.70$; $4.75 \leq c \leq 6.65$, $0.4 \leq a+b \leq 1.35$; $6.0 \leq a+b+c \leq 7.525$. All of these samples contained 2.25 F/8 SiO$_2$ (d=2.25) and were prepared at 22.5% solids. The composition of each sample is given in Table 2A. The samples were prepared using the following procedure. The required amount of magnesia was mixed with water in an amount such that the final feed contained 22.5% solids. All of the HF was slowly added and the mixing was continued for 5 minutes. The lithium hydroxide and sodium hydroxide, as required, were added and the mixing was continued for 5 minutes until all of the base dissolved. Thereafter the silica sol was added and mixed for 10 minutes. The suspensions obtained, which varied from viscous gels to low viscosity liquids, were placed in glass bottles, capped, and placed in an oven at a temperature of 100° C. The suspensions were periodically mixed to keep the solids suspended until irreversibly viscous slurries were obtained from which no solids would settle. The slurries were then allowed to gel and thereafter maintained in the oven at 100° C for 72 hours. The waxy solid gels obtained were dried at 120° C for 16 hours.

The cation exchange capacities (CEC) of the samples were determined as well as their ease of dispersion in deionized water, which was determined as follows: 0.20 grams of <100 mesh sample was added to 9.80 milliliters of deionized water in a bottle and the mixture shaken by hand frequently for up to 2 hours. The "dispersion time" was determined by measuring the time for the particules to disperse as judged by the absence of any particles adhering to the sides of the bottle above the liquid meniscus. The data obtained are given in Table 2A. All of the samples were well crystallized trioctahedral smectite-type clays, as determined by x-ray diffraction, with a 060 (hkl) diffraction band between 60.85 and 61.25°2θ except samples 49 and 51 which were amorphous. The samples containing a smectite-type clay were evaluated for their viscosity building characteristics by preparing 2% dispersions in deionized water and obtaining rotational (Fann-type) viscosimeter rheology data initially and after 24 and 48 hours. The turbidity of these dispersions was measured by determining the percent light transmission with a Hach meter (water = 100% transmission) having a filter with a Corning number of 5330. The data obtained are given in Table 2B.

Table 2A aLi$_2$O: bNa$_2$O: cMgO: 2.25 F: 8 SiO$_2$

| Sample | a | b | c | a+b | a+b+c | CEC | Dispersion Time, Minutes |
|---|---|---|---|---|---|---|---|
| 1 | 0.235 | 0.165 | 5.60 | 0.40 | 6.0 | 75 | >120 |
| 2 | 0.200 | 0.200 | 5.60 | 0.40 | 6.0 | 75 | >120 |
| 3 | 0.335 | 0.165 | 5.50 | 0.50 | 6.0 | 78 | >120 |
| 4 | 0.250 | 0.250 | 5.50 | 0.50 | 6.0 | 80 | >120 |
| 5 | 0.335 | 0.165 | 5.60 | 0.50 | 6.1 | 78 | >120 |
| 6 | 0.200 | 0.300 | 5.60 | 0.50 | 6.1 | 78 | >120 |
| 7 | 0.435 | 0.165 | 5.50 | 0.60 | 6.1 | 83 | 90 |
| 8 | 0.250 | 0.350 | 5.50 | 0.60 | 6.1 | 83 | 30 |
| 9 | 0.435 | 0.165 | 5.60 | 0.60 | 6.2 | 81 | 30 |
| 10 | 0.200 | 0.400 | 5.60 | 0.60 | 6.2 | 81 | 15 |
| 11 | 0.435 | 0.165 | 5.70 | 0.60 | 6.3 | 79 | 30 |
| 12 | 0.435 | 0.165 | 6.00 | 0.60 | 6.6 | 73 | 5 |
| 13 | 0.485 | 0.165 | 5.35 | 0.65 | 6.0 | 89 | 30 |
| 14 | 0.325 | 0.325 | 5.35 | 0.65 | 6.0 | 88 | 20 |
| 15 | 0.535 | 0.165 | 5.50 | 0.70 | 6.2 | 86 | 6 |
| 16 | 0.250 | 0.450 | 5.50 | 0.70 | 6.2 | 86 | 2 |
| 17 | 0.535 | 0.165 | 5.60 | 0.70 | 6.3 | 84 | 5 |
| 18 | 0.535 | 0.165 | 5.80 | 0.70 | 6.5 | 80 | 2.5 |
| 19 | 0.585 | 0.165 | 5.35 | 0.75 | 6.1 | 91 | 15 |
| 20 | 0.325 | 0.425 | 5.35 | 0.75 | 6.1 | 91 | 10 |
| 21 | 0.585 | 0.165 | 5.65 | 0.75 | 6.4 | 84 | 1.5 |
| 22 | 0.635 | 0.165 | 5.20 | 0.80 | 6.0 | 99 | 20 |
| 23 | 0.400 | 0.400 | 5.20 | 0.80 | 6.0 | 98 | 6 |
| 24 | 0.635 | 0.165 | 5.50 | 0.80 | 6.3 | 89 | 2 |
| 25 | 0.335 | 0.500 | 5.85 | 0.835 | 6.65 | 82 | 1 |
| 26 | 0.685 | 0.165 | 5.35 | 0.85 | 6.2 | 94 | 2 |
| 27 | 0.325 | 0.525 | 5.35 | 0.85 | 6.2 | 94 | 1 |
| 28 | 0.710 | 0.165 | 5.15 | 0.875 | 6.025 | 101 | 8 |
| 29 | 0.710 | 0.165 | 5.35 | 0.875 | 6.225 | 94 | 2.5 |
| 30 | 0.710 | 0.165 | 5.55 | 0.875 | 6.425 | 89 | 1.5 |
| 31 | 0.710 | 0.165 | 5.85 | 0.875 | 6.725 | 82 | 2 |
| 32 | 0.710 | 0.165 | 6.15 | 0.875 | 7.025 | 78 | 4.5 |
| 33 | 0.710 | 0.165 | 6.65 | 0.875 | 7.525 | 70 | >60 |
| 34 | 0.735 | 0.165 | 5.20 | 0.90 | 6.1 | 99 | 2.5 |
| 35 | 0.400 | 0.500 | 5.20 | 0.90 | 6.1 | 99 | 2.5 |
| 36 | 0.735 | 0.165 | 5.35 | 0.90 | 6.25 | 95 | 1 |
| 37 | 0.735 | 0.165 | 5.45 | 0.90 | 6.35 | 92 | 1 |
| 38 | 0.735 | 0.165 | 5.55 | 0.90 | 6.45 | 90 | 1 |
| 39 | 0.735 | 0.165 | 5.85 | 0.90 | 6.75 | 84 | 1 |
| 40 | 0.785 | 0.165 | 5.35 | 0.95 | 6.3 | 96 | 1 |
| 41 | 0.835 | 0.165 | 5.00 | 1.0 | 6.0 | 102 | 10 |
| 42 | 0.500 | 0.500 | 5.00 | 1.0 | 6.0 | 108 | 6 |
| 43 | 0.835 | 0.165 | 5.20 | 1.0 | 6.2 | 101 | 1 |
| 44 | 0.400 | 0.600 | 5.20 | 1.0 | 6.2 | 101 | 1.5 |
| 45 | 0.935 | 0.165 | 5.00 | 1.1 | 6.1 | 109 | 2.5 |
| 46 | 0.500 | 0.600 | 5.00 | 1.1 | 6.1 | 109 | >120 |
| 47 | 0.935 | 0.165 | 5.20 | 1.1 | 6.3 | 103 | 2 |
| 48 | 1.035 | 0.165 | 5.00 | 1.2 | 6.2 | 111 | 3 |
| 49 | 0.500 | 0.700 | 5.00 | 1.2 | 6.2 | * | >120 |
| 50 | 1.085 | 0.165 | 4.75 | 1.25 | 6.0 | 109 | >120 |
| 51 | 0.625 | 0.625 | 4.75 | 1.25 | 6.0 | * | >120 |
| 52 | 1.135 | 0.165 | 5.00 | 1.3 | 6.3 | 113 | 4 |
| 53 | 1.185 | 0.165 | 4.75 | 1.35 | 6.1 | 122 | 90 |

*amorphous produdct

Table 2B

2% Dispersions in Deionized Water
Fann Viscosimeter Data

| | Initial | | | After 24 Hours | | | After 48 Hours | | |
|---|---|---|---|---|---|---|---|---|---|
| Sample | A.V.[a] | BYV[b] | %T[c] | A.V. | BYV | %T | A.V. | BYV | %T |
| 1 | 1 | 0 | 20 | 1 | 0 | 27 | 1 | 0 | 29 |
| 2 | 1 | 0 | 22 | 1 | 0 | 30 | 1.5 | 0 | 28 |
| 3 | 1.5 | 0 | 24 | 2 | 0 | 30 | 6 | 5 | 34 |
| 4 | 1.5 | 5 | 25 | 4.5 | 0 | 26 | 9 | 28 | 29 |
| 5 | 1.5 | 0 | 30 | 3.5 | 0 | 29 | 6.5 | 5 | 32 |
| 6 | 1 | 0 | 20 | 1.5 | 0 | 28 | 6.5 | 5 | 28 |
| 7 | 2.5 | 0 | 24 | 14.5 | 59 | 44 | 17.5 | 61 | 46 |
| 8 | 1.5 | 0 | 23 | 7 | 5 | 39 | 13.5 | 33 | 42 |
| 9 | 2 | 0 | 31 | 14 | 36 | 57 | 18.5 | 74 | 60 |
| 10 | 2 | 0 | 28 | 8.5 | 8 | 47 | 16 | 46 | 49 |
| 11 | 3 | 0 | 31 | 17 | 56 | 54 | 20.5 | 79 | 58 |
| 12 | 4.5 | 0 | 41 | 18.5 | 77 | 67 | 21 | 102 | 71 |
| 13 | 3.5 | 0 | 35 | 14 | 36 | 58 | 16 | 51 | 62 |
| 14 | 3 | 0 | 33 | 16.5 | 51 | 51 | 19 | 87 | 52 |
| 15 | 4 | 0 | 66 | 20 | 77 | 87 | 22.5 | 97 | 91 |
| 16 | 2.5 | 0 | 39 | 14.5 | 36 | 66 | 23 | 89 | 71 |

Table 2B-continued

| | 2% Dispersions in Deionized Water Fann Viscosimeter Data | | | | | | | | |
|---|---|---|---|---|---|---|---|---|---|
| | Initial | | | After 24 Hours | | | After 48 Hours | | |
| Sample | A.V.[a] | BYV[b] | %T[c] | A.V. | BYV | %T | A.V. | BYV | %T |
| 17 | 5 | 0 | 71 | 20 | 66 | 91 | 22 | 92 | 92 |
| 18 | 5 | 0 | 54 | 18 | 71 | 83 | 21 | 99 | 85 |
| 19 | 2.5 | 5 | 48 | 11.5 | 18 | 75 | 16.5 | 41 | 77 |
| 20 | 2.5 | 0 | 29 | 9 | 5 | 42 | 14 | 26 | 46 |
| 21 | 8.5 | 18 | 70 | 22 | 102 | 88 | 23.5 | 128 | 89 |
| 22 | 2.5 | 5 | 47 | 7.5 | 10 | 73 | 12 | 31 | 76 |
| 23 | 2.5 | 5 | 45 | 16.5 | 56 | 65 | 21 | 97 | 70 |
| 24 | 6 | 0 | 78 | 20.5 | 79 | 92 | 23.5 | 92 | 93 |
| 25 | 13.5 | 59 | 26 | 19.5 | 122 | 43 | 23 | 128 | 46 |
| 26 | 2.5 | 0 | 86 | 17 | 51 | 93 | 21.5 | 82 | 93 |
| 27 | 4 | 0 | 46 | 22.5 | 89 | 78 | 26.5 | 122 | 82 |
| 28 | 3 | 0 | 78 | 7.5 | 0 | 92 | 12 | 13 | 92 |
| 29 | 5 | 0 | 87 | 19.5 | 66 | 92 | 23 | 87 | 92 |
| 30 | 6.5 | 5 | 83 | 19 | 71 | 88 | 20 | 87 | 88 |
| 31 | 11 | 36 | 67 | 19.5 | 92 | 82 | 20 | 97 | 85 |
| 32 | 13.5 | 77 | 37 | 20 | 120 | 55 | 21.5 | 128 | 62 |
| 33 | 9.5 | 26 | 19 | 19 | 102 | 33 | 24 | 117 | 35 |
| 34 | 2.5 | 5 | 88 | 14.5 | 41 | 93 | 20 | 66 | 95 |
| 35 | 2.5 | 0 | 49 | 22 | 94 | 76 | 25.5 | 122 | 82 |
| 36 | 4 | 0 | 90 | 22 | 77 | 93 | 24.5 | 82 | 93 |
| 37 | 4.5 | 0 | 87 | 21.5 | 61 | 90 | 23.5 | 92 | 90 |
| 38 | 8.5 | 0 | 85 | 21.5 | 92 | 89 | 23 | 105 | 88 |
| 39 | 13 | 46 | 76 | 20 | 97 | 84 | 21.5 | 112 | 84 |
| 40 | 3.5 | 0 | 89 | 23.5 | 92 | 91 | 26 | 107 | 92 |
| 41 | 2.5 | 5 | 64 | 4 | 3 | 80 | 8 | 5 | 86 |
| 42 | 2.5 | 0 | 35 | 18 | 54 | 55 | 22 | 87 | 61 |
| 43 | 3 | 0 | 85 | 21.5 | 82 | 88 | 24.5 | 102 | 89 |
| 44 | 3 | 0 | 17 | 16.5 | 51 | 32 | 20 | 87 | 36 |
| 45 | 2.5 | 0 | 85 | 22.5 | 87 | 88 | 25.5 | 112 | 88 |
| 46 | 1.5 | 0 | 9 | 2.5 | 0 | 12 | 4.5 | 5 | 13 |
| 47 | 3 | 0 | 85 | 23 | 82 | 88 | 26.5 | 122 | 88 |
| 48 | 6.5 | 3 | 77 | 24 | 105 | 86 | 26 | 107 | 85 |
| 50 | 2.5 | 0 | 25 | 13.5 | 38 | 39 | 15.5 | 56 | 42 |
| 52 | 14 | 36 | 67 | 28 | 145 | 80 | 32.5 | 194 | 81 |
| 53 | 2 | 0 | 22 | 16 | 59 | 40 | 22.5 | 84 | 45 |

[a]A.V. = Apparent Viscosity, cp., at 1020 sec$^{-1}$
[b]BYV = Bingham Yield Value, dynes/cm$^2$
[c]%T = Percent Transmission The data indicate that gellants which will disperse within 15 minutes at low shear at a concentration of 2% in deionized water to produce a sol having a low viscosity and a Bingham Yield Value less than 20 dynes/cm.$^2$, which sol is converted on aging to a thixotropic gel having a Bingham Yield Value greater than about 50 dynes/cm.$^2$, are obtained when $0.25 \leq a < 1.1$, $0 \leq b < 0.60$, $4.75 < c < 5.85$, $0.60 \leq a + b < 1.25$, $6.0 < a + b + c < 6.65$, and $70 < CEC < 120$. The preferred gellants of this invention, which in addition to these rheological properties produce dispersions at 2% in deionized water having a clarity of at least 85% transmittance, are obtained when $0.50 < a < 1.05$, $0 \leq b < 0.50$, $5.0 \leq c < 5.85$, $0.60 < a+b < 1.25$, $6.0 < a+b+c < 6.65$, and $80 < CEC < 113$. Gellants which produce dispersions having a charity of at least 90% transmittance, which are especially preferred, are obtained when $0.50 < a < 0.80$, $0 \leq b < 0.50$, $5.1 < c < 5.7$, $0.60 < a+b < 1.0$, $6.025 < a+b+c < 6.4$, and $80 < CEC < 100$.

Generally, as the sum $(a+b+c)$ increases, the Bingham Yield Values of the dispersions after 48 hours increase and the % transmittance values of the dispersions decrease. When either $a > 1.1$, $c \geq 5.85$, or $(a+b+c) > 6.65$, the initial Bingham Yield Values are greater than 20 dynes/cm.$^2$ When $b > 0.60$ a smectite-type clay could not be synthesized and a totally amorphous product was obtained. Gellants having poor dispersion characteristics were obtained when either $c \leq 4.75$, $(a+b) < 0.6$, or $(a+b+c) >$ ca. 7.25. Generally poor gellants were obtained when either a $< 0.25$ or $(a+b+c) = 6.0$.

Samples 28–32 were evaluated for their cation exchange capacity by the well-known ammonium acetate method. The extracted aqueous solutions were also analyzed to determine the concentration of soluble Li$^+$, Na$^+$, and Mg$^{2+}$ in the solutions. The data obtained were used to calculate the sum of the number of exchange cations plus soluble cations per eight silicon atoms (unit cell of smectite-type clay) in the samples. These data in turn were used to calculate the minimum number of moles of Mg, Li and Na which were present in the samples in excess of their concentration in the smectite-type phase. The data obtained are given in Table 2C. The data in columns (a), (b) and (c) are the known number of Li, Na and Mg atoms per eight silicon atoms in the gellant. The data in columns (d), (e) and (f) are the calculated number of Li, Na and Mg atoms present as exchange cations and soluble cations per eight silicon atoms in the gellant, as determined from the analyses of the exchange solutions. The data in column (g) is the number of Li atoms in the central octahedral layer of the smectite-type clay present in each of the samples, and is the difference between columns (a) and (d). The data in column (h) is the number of equivalents of exchangeable cations per eight silicon atoms in each sample as determined from the cation exchange capacity. The data in column (i) is the number of Mg atoms in the central octahedral layer of the smectite-type clay present in each of the samples. The first figure represents the difference [6−(h)] which assumes that the CEC of the smectite phase originates by substituting a monovalent atom for a magnesium atom within the central octahedral layer of the smectite. Since the CEC of the smectite-type clay is greater than the number of Li atoms present in the octahedral layer of the clay, in this case there must be present within the layer lattices of the clay [(h) − (g)] hydrogen atoms. The second figure in column (i) represents the difference {6− [(g) + (h)]÷2} which indicates that the CEC of the smectite originates by substituting the number of Li atoms indicated in column (g) for an equivalent number of Mg atoms plus replacing some of the Mg atoms with a vacancy within the lattice. The data in column (j) are the difference [(c) − (i) − (f)] and represent the minimum number of Mg atoms per eight silicon atoms which are present in excess of the Mg in the smectite-type clay. The data in column (k) is the minimum number of (Li+Na) atoms per eight silicon atoms which are present in the gellant in excess of the (Li+Na) in the smectite-type clay and represent the value [(a) + (b) − (g) − (h)].

Comparison of the data in Table 2B and Table 2C indicates that the gellants of this invention must contain an amount of Na and/or Li, and Mg which is in excess of the amount of each in the smectite-type clay phase in the gellant. Thus the gellant must contain an occluded phase of magnesium oxide and/or hydroxide, and an occluded phase consisting of the oxides and/or hydroxides of sodium and/or lithium.

Table 2C

| Sample | (a) Li | (b) Na | (c) Mg | (d) Li | (e) Na | (f) Mg | (g) Octahedral Li in Smectite | (h) Exchange Cations Per Unit Cell, CEC |
|---|---|---|---|---|---|---|---|---|
| | Cations per Eight Silicon Atoms in Gellant | | | Exchange Cations & Soluble Cations Per Eight Silicons | | | | |
| 28 | 1.42 | 0.33 | 5.15 | 0.74 | 0.38 | 0.01 | 0.68 | 0.77 |
| 29 | 1.42 | 0.33 | 5.35 | 0.76 | 0.36 | 0.02 | 0.66 | 0.72 |
| 30 | 1.42 | 0.33 | 5.55 | 0.78 | 0.37 | 0.04 | 0.64 | 0.70 |
| 31 | 1.42 | 0.33 | 5.85 | 0.84 | 0.37 | 0.11 | 0.58 | 0.66 |
| 32 | 1.42 | 0.33 | 6.15 | 0.89 | 0.40 | 0.16 | 0.53 | 0.64 |

| Sample | (i) Mg per Unit Cell of Smectite Required From CEC | (j) Minimum Excess Mg Per Eight Silicon Atoms | (k) Minimum Excess Li + Na Per Eight Silicon Atoms |
|---|---|---|---|
| 28 | 5.23 − 5.275 | None | 0.30 |
| 29 | 5.28 − 5.31 | 0.05 − 0.002 | 0.37 |
| 30 | 5.30 − 5.33 | 0.21 − 0.18 | 0.41 |
| 31 | 5.34 − 5.38 | 0.40 − 0.36 | 0.51 |
| 32 | 5.36 − 5.415 | 0.63 − 0.575 | 0.58 |

EXAMPLE 2

Samples having the composition:

0.67 Li$_2$O:0.165 Na$_2$O:5.33 MgO:2.25 F:8 SiO$_2$ were prepared at 18% solids in the following manner: MgO and HF were added to deionized water in the order indicated in Table 3 and mixed with a Lightnin Mixer for various periods of time as indicated in the table. Thereafter LiOH.H$_2$O was added and mixed for the time indicated in Table 3. The silica sol was then added and mixed for 10 minutes before heating and mixing the suspension until a viscous slurry was obtained. The viscous slurry was placed in a sealed container at 100° C. The slurry gelled and the gel was aged at 100° C for 72 hours. A waxy solid was obtained which was dried overnight at 110° C. An additional sample was prepared by shearing the suspension for 2 minutes in a Waring Blendor before commencing the heating. Another gellant was produced by preparing the entire suspension in a Waring Blendor at low shear with a final 5 minutes of high shear before commencing the heating. The samples were evaluated at 2.5% dispersions in tap water. The data obtained are given in Table 3.

Table 3

| Sample | MgO Order of Addition | MgO Mixing Time, Min. | MgO % | HF Order of Addition | HF Mixing Time, Min. | LiOH.H$_2$O Mixing Time, Min. |
|---|---|---|---|---|---|---|
| 1 | 1 | 5 | 9.5 | 2 | 5 | 5 |
| 2 | 1 | 15 | 9.5 | 2 | 5 | 5 |
| 3 | 1 | 30 | 9.5 | 2 | 5 | 5 |
| 4 | 1 | 60 | 9.5 | 2 | 5 | 5 |
| 5 | 1 | 1200 | 9.5 | 2 | 5 | 5 |
| 6 | 2 | 5 | 9.5 | 1 | * | 5 |
| 7 | 2 | 10 | 9.5 | 1 | * | 5 |
| 8 | 2 | 20 | 9.5 | 1 | * | 5 |
| 9 | 2 | 30 | 9.5 | 1 | * | 5 |
| 10 | 2 | 60 | 9.5 | 1 | * | 5 |
| 11 | 2 | 5 | 13.7 | 1 | * | 5 |
| 12 | 2 | 5 | 15.3 | 1 | * | 5 |
| 13 | 2 | 5 | 18.7 | 1 | * | 5 |
| 14 | 2 | 5 | 23.4 | 1 | * | 5 |
| 15 | 1 | 5 | 9.5 | 2 | 5 | 10 |
| 16 | 1 | 5 | 9.5 | 2 | 5 | 20 |
| 17 | 1 | 5 | 9.5 | 2 | 5 | 30 |
| 18** | 2 | 5 | 9.5 | 1 | * | 5 |
| 19*** | 2 | 5 | 9.5 | 1 | * | 5 |

2.5% in Tap Water

| Sample | Clarity % Transmittance | Apparent Viscosity | Bingham Yield Value |
|---|---|---|---|
| 1 | 64 | 13.5 | 100 |
| 2 | 80 | 13.5 | 87 |
| 3 | 72 | 12.5 | 77 |
| 4 | 80 | 14 | 92 |
| 5 | 44 | 4 | 20 |
| 6 | 53 | 3 | 26 |
| 7 | 69 | 12 | 102 |
| 8 | 54 | 15 | 112 |
| 9 | 55 | 23 | 235 |
| 10 | 27 | 9 | 66 |
| 11 | 64 | 6 | 51 |
| 12 | 53 | 11 | 82 |
| 13 | 72 | 15 | 102 |
| 14 | 77 | 20 | 207 |
| 15 | 56 | 7 | 51 |
| 16 | 85 | 20 | 199 |
| 17 | 86 | 20 | 179 |
| 18** | 86 | 13.5 | 97 |
| 19*** | 93 | 16 | 161 |

*MgO added immediately after adding the HF
**Suspension after silica sol addition was given 2 minutes high shear in a Waring Blendor
***Entire feed made in a Waring Blendor at low shear. The suspension after silica sol addition was given 5 minutes of high shear.

EXAMPLE 3

A gellant was prepared having the composition:

0.75 Li$_2$O:0.165 Na$_2$O:5.25 MgO:2.25 F:8 SiO$_2$ by mixing the MgO (14.7%) and water together for 5 minutes, adding HF and mixing 10 minutes, adding LiOH.H$_2$O and mixing 5 minutes, adding the silica sol and water to give a feed suspension containing 20% solids and mixing 10 minutes. Heat was applied and the mixing continued until a viscous slurry was obtained. The mixer was removed from the vessel, the vessel closed, and the viscous slurry was heated at 100° C for 72 hours. The slurry gelled shortly after the mixer was removed. A waxy paraffin-like solid was obtained which was dried for 16 hours at 110° C. The magnesia used in this example was Grade 1782 obtained from Michigan Chemical Corp. It contains a minimum MgO content of 98.0%, ignited basis, from 0.50 – 1.00% CaO, from 0.14 – 0.30% $SiO_2$, from 0.10 – 0.18% $Fe_2O_3$, from 0.04 – 0.15% $Al_2O_3$, a loss on ignition from 4.0 – 10.0%, an iodine number from 70 to 85 meq./100 gm., and a screen size such that from 99.5 to 100% passes through a 325 mesh screen (wet). The gellant was dispersed in deionized water at a concentration of 2% by mixing for 5 minutes in a Waring Blendor. Thereafter various concentrations of a 0.02 N$MgCl_2$ solution were added, the dispersion mixed an additional two minutes and the rheological characteristics of the dispersion obtained. The data are given in Table 4.

Table 4

| | 2% Gellant in Deionized Water | |
|---|---|---|
| $MgCl_2$ Meq./l. | Apparent Viscosity | Bingham Yield Value |
| 0 | 1 | 3 |
| 1 | 3.5 | 15 |
| 2 | 9 | 41 |
| 3 | 16 | 92 |
| 4 | 20.5 | 148 |
| 5 | 25 | 194 |
| 6 | 29 | 173 |
| 7 | 28.5 | 179 |
| 8 | 24.5 | 128 |
| 9 | 18 | 102 |
| 10 | 17.5 | 66 |

EXAMPLE 4

A gellant was prepared using the procedure of Example 3 except that the magnesia used was Fisher Chemical Co. reagent grade M-49. The gellant obtained readily dispersed in deionized water to produce a low viscosity sol having 88% light transmittance. The Bingham Yield Value of a 2.5% dispersion in tap water was 143 dynes/cm². This magnesia has a BET surface area of 100 m.²/gm.

EXAMPLE 5

A gellant having the composition:

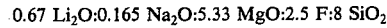

0.67 $Li_2O$:0.165 $Na_2O$:5.33 MgO:2.5 F:8 $SiO_2$ was prepared by the process of Example 3 except that Magox HR98 was used as the source of magnesia and the magnesia was mixed in water at a concentration of 20% before addition of the HF. The gellant dispersed in deionized water at 2% within 1 minute with only hand shaking. A 2% dispersion in deionized water produced a sol having an initial apparent viscosity and Bingham Yield Value of 6 cp. and 5 dynes/cm.², respectively. Within 48 hours the sol became a thixotropic viscous gel having an apparent viscosity of 21 cp. and a Bingham Yield Value of 102 dynes/cm².

This gellant was dispersed in deionized water at the concentrations listed in Table 5A in a Waring Blendor and the viscosities of the dispersions were measured with a Brookfield RVF viscometer at 10 and 100 rpm. The gellant was mixed with $CaCl_2$, hydroxyethyl cellulose, or sodium polyacrylate as indicated in Table 5A and the mixtures were dispersed and evaluated as above. The data obtained are given in Table 5A.

Table 5A

| % Gellant | % $CaCl_2$ | % HEC | % SPA | Viscosity, cp. 10 rpm | Viscosity, cp. 100 rpm |
|---|---|---|---|---|---|
| 1.0 | 0 | 0 | 0 | 5 | 14 |
| 2.0 | 0 | 0 | 0 | 1200 | 224 |
| 3.0 | 0 | 0 | 0 | 8100 | 1080 |
| 4.0 | 0 | 0 | 0 | 19500 | 2650 |
| 5.0 | 0 | 0 | 0 | 50000 | 5800 |
| 0.973 | 0.027 | 0 | 0 | 540 | 86 |
| 1.460 | 0.040 | 0 | 0 | 1850 | 235 |
| 1.703 | 0.047 | 0 | 0 | 2750 | 330 |
| 1.946 | 0.054 | 0 | 0 | 4500 | 525 |
| 2.433 | 0.067 | 0 | 0 | 10700 | 1100 |
| 1.8 | 0 | 0.2 | 0 | 1040 | 178 |
| 1.6 | 0 | 0.4 | 0 | 2950 | 505 |
| 1.4 | 0 | 0.6 | 0 | 5300 | 1110 |
| 1.2 | 0 | 0.8 | 0 | 7200 | 1480 |
| 1.0 | 0 | 1.0 | 0 | 10000 | 2000 |
| 1.84 | 0 | 0 | 0.16 | 2460 | 960 |
| 1.8 | 0 | 0 | 0.2 | 6350 | 1920 |
| 1.72 | 0 | 0 | 0.28 | 25600 | 3980 |
| 1.6 | 0 | 0 | 0.4 | 43500 | 7850 |
| 1.4 | 0 | 0 | 0.6 | 27500 | 6800 |

The gellant was dispersed in tap water at a concentration of 3%, heated to 65° C, and thereafter either dimethyldihydrogenated tallow ammonium chloride or dimethylbenzylhydrogenated tallow ammonium chloride was added in the amounts indicated in Table 5B to form a series of organophilic gellants. The solids readily flocculated and were thereafter filtered, washed with tap water and dried at 65° C. The washing removed essentially all of the sodium from the product and essentially all of the lithium which is not present in the octahedral layer of the smectite-type clay. However the excess Mg(O, $OH_2$) which was present in the gellant was retained in the organophilic gellants. Thus these organophilic gellants are mixtures of the organophilic smectitetype clay and an occluded phase selected from the group consisting of magnesium oxide, magnesium hydroxide, and mixtures thereof. These organophilic gellants were dispersed at a concentration of 3% in toluene containing 1.2% of a polar additive dispersant mixture (95% by weight methanol, 5% water) in a Waring Blendor. The viscosities of the resultant toluene gels were measured with a Brookfield RVF viscometer at 10 and 100 r.p.m. The data obtained are given in Table 5B.

Table 5B

| Organophilic Gellant | Organic Reactant* | ME Ratio** | 3% in Toluene Viscosity, cp. 10 rpm | 3% in Toluene Viscosity, cp. 100 rpm |
|---|---|---|---|---|
| 1 | DMDHT | 104.5 | 300 | 48 |
| 2 | DMDHT | 122.1 | 540 | 66 |
| 3 | DMDHT | 144.9 | 720 | 72 |
| 4 | DMDHT | 164.0 | 1950 | 150 |
| 5 | DMDHT | 188.3 | 1080 | 146 |
| 6 | DMDHT | 209.9 | 950 | 105 |
| 7 | DMBHT | 113.0 | 100 | 26 |
| 8 | DMBHT | 121.0 | 200 | 40 |
| 9 | DMBHT | 148.0 | 240 | 40 |
| 10 | DMBHT | 175.7 | 400 | 56 |
| 11 | DMBHT | 204.9 | 680 | 80 |
| 12 | DMBHT | 220.6 | 1400 | 144 |

*DMDHT = dimethydihydrogenatedtallow ammonium chloride
DMBHT = dimethylbenzylhydrogenatedtallow ammonium chloride
**Milliequivalents of organic reactant per 100 grams of gellant

EXAMPLE 6

A gellant having the composition:

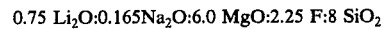

0.75 $Li_2O$:0.165$Na_2O$:6.0 MgO:2.25 F:8 $SiO_2$ was prepared by the process of Example 5. 0.07 moles of $MgCl_2$. 6 $H_2O$ and 0.07 moles of $CaCl_2$. 6 $H_2O$ were added to a portion of the waxy solid product obtained before drying. The resulting product was then dried for 16 hours at 100° C. The gellants were dispersed at a concentration of 2.5% in deionized water and tap water, and the following data obtained:

| (MgCl$_2$ + CaCl$_2$) in Gellant | Water | Initial | | 24 Hours | |
|---|---|---|---|---|---|
| | | A.V. | BYV | A.V. | BYV |
| 0 | Deionized | 22.5 | 214 | 33.5 | 291 |
| 0 | Tap | 27.5 | 280 | 34.5 | 357 |
| 0.14 m. | Deionized | 38.5 | 393 | 44 | 428 |
| 0.14 m. | Tap | 37.5 | 352 | 42.5 | 434 |

EXAMPLE 7

Samples having the composition 0.735 Li$_2$O:0.165 Na$_2$O:5.3 MgO:dF:8 SiO$_2$ were prepared by the process of Example 1. The value of d was varied from 1 to 3.5. The samples all contained well crystallized trioctahedral smectite-type clays, as determined by x-ray diffraction. They were evaluated as in Example 1 for their ease of dispersion in deionized water, for their viscosity building characteristics in deionized water, and for their turbidity. The data obtained are given in Table 6. The data indicate that gellants having the desired properties can be prepared when the number of fluorine atoms per unit cell of smectite-type clay is within the range from 1 to 3.5, preferably from 1.5 to 3.5, more preferably $1.5 < d < 3.0$.

Table 6

| 0.735 Li$_2$O : 0.165 Na$_2$O : 5.3 MgO : dF : 8 SiO$_2$ 2% Dispersions in Deionized Water | | | | | | | |
|---|---|---|---|---|---|---|---|
| | Dispersion Time, | Fann Viscosimeter and Hach Meter Data* | | | | | |
| | | Initial | | | 48 Hours | | |
| d | Minutes | A.V. | BYV | %T | A.V. | BYV | %T |
| 1 | 6 | 6.5 | 10 | 29 | 36 | 173 | 65 |
| 1.5 | 2.5 | 8.5 | 15 | 73 | 33.5 | 217 | 85 |
| 2 | 1.25 | 7 | 8 | 84 | 28 | 173 | 90 |
| 2.5 | 4 | 2 | 0 | 84 | 23 | 87 | 94 |
| 3 | 0.75 | 8 | 13 | 80 | 18.5 | 82 | 86 |
| 3.5 | 2 | 2 | 0 | 83 | 20 | 79 | 91 |

*A.V. = Apparent Viscosity, cp., at 1020 Sec$^{-1}$ ± 0.5
BYV = Bingham Yield Value, dynes/cm.$^2$
%T = Percent Transmission of light, Hach Meter

We claim:

1. A process for preparing a gellant consisting of a complex of a fluorine-containing trioctahedral smectite-type clay and an occluded amorphous phase selected from the group consisting of lithium hydroxide, sodium hydroxide, magnesium hydroxide, lithium oxide, sodium oxide, magnesium oxide, and mixtures thereof, said gellant containing mole ratios of Li, Na, Mg and Si, expressed as oxides, and F, of $$aLi_2O:bNa_2O:cMgO:dF:8SiO_2 \qquad (I)$$

where $0.25 \leq a < 1.1$, $0 \leq b < 0.60$, $4.75 < c < 5.85$, $0.5 < d \leq 3.5$, $0.6 \leq a+b < 1.25$, $6.0 < a+b+c < 6.65$, and said gellant being characterized as having a cation exchange capacity within the range from about 0.7 to 1.2 milliequivalents per gram, a Bingham Yield Value of at least about 50 dynes/cm.$^2$ as a 2% dispersion in water, and the ability to disperse in deionized water within 15 minutes at a concentration of 2% by weight to produce a sol having a Bingham Yield Value less than 20 dynes/cm.$^2$, which sol is slowly converted to a thixotropic gel having a Bingham Yield Value above 50 dynes/cm.$^2$, said process comprising:

a. forming an aqueous suspension containing from 12 to 35% solids by weight, the solidss having the chemical composition represented by formula I, by:
(i) combining and mixing magnesium oxide, water, hydrofluoric acid, and a base selected from the group consisting of lithium hydroxide, sodium hydroxide, and mixtures thereof, until the base is dissolved; and (ii) adding a silica sol;

b. agitating and heating the suspension until a viscous slurry is obtained from which no solids settle out;

c. allowing the slurry to gel;

d. hydrothermally reacting the gel under autogenous pressure at a temperature within the range from 85° to about 250° C for a period of time sufficient to form said gellant; and e. drying the solid obtained.

2. The process of claim 1 wherein the apparent viscosity of the viscous slurry is at least 10 centipoises.

3. The processs of claim 1 wherein said hydrothermal treatment is conducted at a temperature within the range from 85° to 165° C for 4 to 120 hours.

4. The process of claim 1 wherein said solid is dried at a temperature less than about 250° C.

5. The process of claim 4 wherein the apparent viscosity of the viscous slurry is at least 15 centipoises, and wherein said hydrothermal treatment is conducted at a temperature within the range from 85° C to 165° C for 4 to 120 hours.

6. The process of claim 1 wherein $0.50 < a < 1.05$, $0 \leq b < 0.50$, $5.0 \leq c < 5.85$, $1.5 \leq d \leq 3.0$, $0.60 < a+b < 1.25$, $6.0 < a+b+c < 6.65$, and wherein the cation exchange capacity of said gellant is within the range from 0.8 to 1.13 milliequivalents per gram.

7. The process of claim 6 wherein said magnesium oxide, said hydrofluoric acid, and at least a portion of said water are mixed together before adding said base.

8. The process of claim 7 wherein the apparent viscosity of the viscous slurry is at least 10 centipoises.

9. The process of claim 7 wherein said hydrothermal treatment is conducted at a temperature within the range from 85° to 165° C for 4 to 120 hours.

10. The process of claim 7 wherein said solid is dried at a temperature less than about 250° C.

11. The process of claim 10 wherein the apparent viscosity of the viscous slurry is at least 15 centipoises, and wherein said hydrothermal treatment is conducted at a temperature within the range from 85° C to 165° C for 4 to 120 hours.

12. The process of claim 1 wherein $0.50 < a < 0.80$, $0 \leq b < 0.50$, $5.1 < c < 5.7$, $1.5 < d < 3.0$, $0.60 < a+b < 1.0$, $6.025 < a+b+c < 6.4$, and wherein the cation exchange capacity of said gellant is within the range from 0.8 to 1.0 milliequivalents per gram.

13. The process of claim 12 wherein said magnesium oxide, said hydrofluoric acid, and at least a portion of said water are mixed together before adding said base.

14. The process of claim 13 wherein the apparent viscosity of the viscous slurry is at least 10 centipoises.

15. The process of claim 13 wherein said solid is dried at a temperature less than about 250° C.

16. The process of claim 13 wherein said hydrothermal treatment is conducted at a temperature within the range from 85° to 165° C for 4 to 120 hours.

17. The process of claim 16 wherein the apparent viscosity of the viscous slurry is at least 15 centipoises and wherein said solid is dried at a temperature less than about 250° C.

18. The product produced by the process of claim 1.
19. The product produced by the process of claim 5.
20. The product produced by the process of claim 6.
21. The product produced by the process of claim 7.
22. The product produced by the process of claim 11.
23. The product produced by the process of claim 12.
24. The product produced by the process of claim 13.
25. The product produced by the process of claim 17.
26. A gellant consisting of a synthesized complex of a fluorine-containing trioctahedral smectite-type clay and an occluded amorphous phase selected from the group consisting of lithium hydroxide, sodium hydroxide, magnesium hydroxide, lithium oxide, sodium oxide, magnesium oxide, and mixtures thereof, said gellant containing mole ratios of Li, Na, Mg and Si, expressed as oxides, and F of $a\text{Li}_2\text{O}:b\text{Na}_2\text{O}:c\text{MgO}:d\text{HF}:8\text{SiO}_2$ where $0.25 \leq a < 83$ $1.1, 0 \leq b < 0.60, 4.75 < c < 5.85, 0.5 < d \leq 3.5, 0.6 \leq a+b < 1.25, 6.0 < a+b+c < 6.65$, and said gellant being characterized as having a cation exchange capacity within the range from about 0.7 to 1.2 milliequivalents per gram, a Bingham Yield Value of at least 50 dynes/cm.$^2$ as a 2% dispersion in water, and the ability to disperse in deionized water within 15 minutes at a concentration of 2% by weight to produce a sol having a Bingham Yield Value less than about 20 dynes/cm.$^2$, said sol being converted to a thixotropic gel having a Bingham Yield Value above 50 dynes/cm.$^2$ upon aging.

27. The gellant of claim 26 wherein $0.50 < a < 1.05, 0 \leq b < 0.50, 5.0 \leq c < 5.85, 1.5 \leq d \leq 3.0, 0.60 < a+b < 1.25, 6.0 < a+b+c < 6.65$, and wherein said cation exchange capacity is within the range from about 0.8 to 1.13 milliequivalents per gram.

28. The gellant of claim 26 wherein $0.50 < a < 0.80, 0 \leq b < 0.50, 5.1 < c < 5.7, 1.5 < d < 3.0, 0.60 < a+b < 1.0, 6.025 < a+b+c < 6.4$, and wherein said cation exchange capacity is within the range from 0.8 to 1.0 milliequivalents per gram.

29. A process for the synthesis of an organophilic gellant consisting essentially of an organophilic smectite-type clay and an occluded compound selected from the group consisting of magnesium oxide, magnesium hydroxide, and mixtures thereof, said process comprising dispersing the gellant formed by the process of claim 1 in water, reacting the gellant with an orgaic compound containing at least one cationic group capable of undergoing a cation exchange reaction with the smectite-type clay in said gellant, and thereafter filtering, washing, and drying the product of the reaction to form said organophilic gellant.

30. An organophilic gellant consisting of an organophilic smectite-type clay and an occluded compound selected from the group consisting of magnesium oxide, magnesium hydroxide, and mixtures thereof prepared by the process of claim 29.

31. The process of increasing the viscosity of an aqueous system which comprises the step of adding to said system a quantity of the mineral composition of claim 18 sufficient to increase said viscosity.

32. A composition of matter comprising an aqueous phase and an amount of the gellant of claim 26 sufficient to increase the viscosity of said composition.

33. The process of increasing the viscosity of a liquid organic system which comprises the step of adding to said system a quantity of the organophilic gellant of claim 30 sufficient to increase said viscosity.

34. A composition of matter comprising a liquid organic phase and an amount of the organophilic gellant of claim 30 sufficient to increase the viscosity of said composition.

* * * * *